Figure 2:
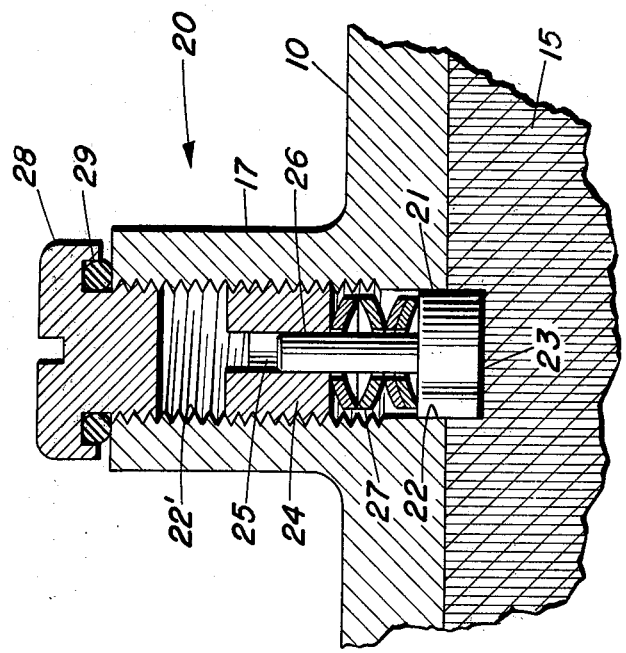

United States Patent [19]

Borden et al.

[11] 4,341,968

[45] Jul. 27, 1982

[54] SUPPORT MEANS FOR HIGH-TEMPERATURE GENERATOR STATORS

[75] Inventors: Raymond W. Borden, Farmingdale; James E. DeBard, Eatontown, both of N.J.

[73] Assignee: The Bendix Corporation, Teterboro, N.J.

[21] Appl. No.: 173,780

[22] Filed: Jul. 30, 1980

[51] Int. Cl.³ .............................................. H02K 5/00
[52] U.S. Cl. ..................................... 310/91; 310/258; 310/259
[58] Field of Search .................... 310/51, 91, 89, 254, 310/258, 259

[56] References Cited

U.S. PATENT DOCUMENTS

| | | | |
|---|---|---|---|
| 1,764,890 | 6/1930 | Reichel | 310/258 |
| 3,293,464 | 12/1966 | Spirk | 310/91 X |
| 3,708,707 | 1/1973 | Kranz | 310/258 |
| 3,988,622 | 10/1976 | Starcevic | 310/91 |
| 4,145,626 | 3/1979 | Aroshidze | 310/91 |

Primary Examiner—Donovan F. Duggan
Attorney, Agent, or Firm—Anthony F. Cuoco; Bruce L. Lamb

[57] ABSTRACT

Means for assembling ferromagnetic stators of rotating electric machines to housings made of lightweight alloys where high temperature operation causes loss of interference fit between stator and housing. Keys are equally spaced about the housing and are spring loaded with Belleville-type springs to maintain adequate centering forces on the stator at high temperature.

7 Claims, 2 Drawing Figures

SUPPORT MEANS FOR HIGH-TEMPERATURE GENERATOR STATORS

The present invention relates generally to light weight, high temperature rise rotating electrical machines such as generators and motors and particularly to improved means for maintaining the machine stator in a fixed radial and axial relationship to the machine housing.

In rotating electrical machines intended for aircraft use or other applications where the weight of the machine is of critical importance, it is common design practice to employ light weight non-magnetic alloys for such structural parts as do not figure in the machine magnetic circuits and to use the heavier magnetic materials only where necessary to achieve high electrical efficiency. A frequently seen form of construction comprises an armature or rotor built up from a stack of circular laminas of iron alloy and having windings or shorting bars imbedded therein. The rotor is positioned coaxially with respect to a stator built up from a stack of annular laminas of iron alloy and having windings imbedded therein. A cylindrical housing surrounds the stator and provides bearing mounts for supporting the rotor coaxially with respect to the stator. The major function of the housing is to support and protect the rotor and stator elements of the machine and to provide means for mounting the machine to a source of motive power or a load. Since the magnetic properties of the housing are relatively unimportant to the efficiency of the design, the housing may be made of light weight, non-magnetic material, suitably an alloy of aluminum or magnesium.

Heretofore, in machines of this general construction, the stator has been secured in the housing by pressing the stator into the housing both of which are so dimensioned as to provide an interference fit therebetween. This method of retention is adequate for machines operating at relatively low temperatures. However, improvements in insulating materials have enabled the acceptable temperature rises of machines to be much increased, providing increased capacity from the machine at no increase in weight. Acceptable operating temperatures of 180° C. or more are found in certain high performance machines. Because the thermal coefficient of expansion of the housing material is about double that of the stator material, the interference fit between the housing and stator is lost long before the rated operating temperature of the machine is reached and the stator becomes free to rotate or be displaced axially or radially.

Set screws driven through the housing and bearing on indentations or flats on the stator have been used to overcome the loss of interference fit at high temperature. Such means also prove to be an inadequate method of securing the stator to the housing as temperatures are further increased particularly in larger diameter machines. At high temperature set screws may offer some constraint against rotation or axial displacement of the stator, depending upon whether the set screws remain in shear contact with the stator, but the stator will still be free to move eccentrically under the radial loads of armature reaction, possibly severely damaging the machine.

It is an object of the present invention to provide in a rotating electrical machine, means for securing a stator in a housing where the housing and the stator are constructed of materials having substantially different thermal expansion coefficients.

It is another object of the invention to provide in an electrical machine means for securing a stator in a housing which is not dependent upon an interference fit and which provides, over a wide temperature range, constraint against rotation and axial and radial displacements.

Briefly, the invention comprises spring loaded key means symmetrically positioned about the circumference of the machine housing to maintain the machine stator in axial alignment and to secure the stator against rotation and axial displacement. The keys are slidingly mounted in the housing and are thrust continuously into contact with the stator by Belleville-type spring washers which bear upon the keys and which are prestressed by a loading screw threaded into the housing. Pre-stress is applied to the degree necessary to insure that adequate centering forces will be applied to the stator and that shear contact will be maintained even after the spring pre-load is caused to be relaxed by expansion of the housing.

Figure 1:
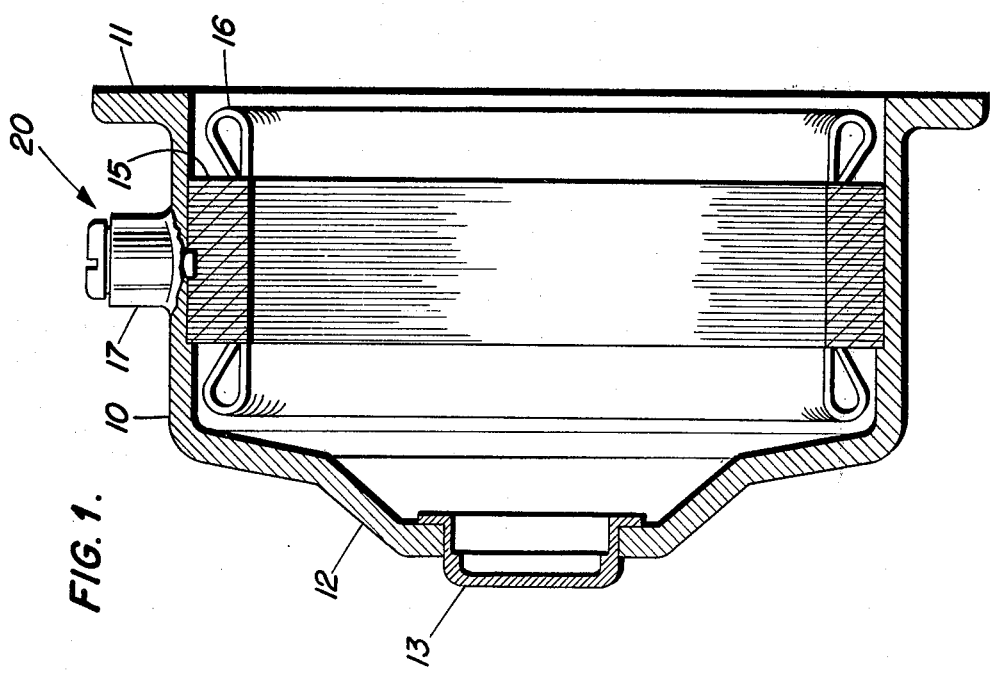

In the drawings:

FIG. 1 is a section of a simplified rotating electrical machine showing only the housing, stator and one of the means of the invention for securing the stator in the housing; and FIG. 2 is an enlarged sectional view of the securing means of the invention.

Referring to FIG. 1, the simplified electrical machine there shown comprises a generally cylindrical housing 10 molded of light weight aluminum or magnesium alloy and including a mounting flange 11 and a closed end wall 12 supporting a mount 13 for a rotor bearing (not shown). A stator 15 formed of a stack of annular laminas of ferromagnetic material and having electrical windings 16 imbedded therein is fitted within the housing 10. In the simplified machine of FIG. 1 showing of the rotor, housing end wall opposite wall 12 and appropriate rotor bearings has been omitted for clarity. It will be understood, however, that a complete machine will include the omitted elements or their equivalents.

At lower temperatures the fit between the housing and the stator is an interference class fit. At temperatures rises of 100° C. or more above ambient, the interference fit is lost and the stator becomes displaceable within the housing. The securing means of the invention prevents such displacement. To contain the securing means 20, a plurality of bosses 17 are molded on the outer surface of housing 10. Only one boss is shown in FIG. 1 but it is to be understood that three or more such bosses are provided at evenly spaced intervals about the periphery of housing 10, each of which contains the securing means 20 described more particularly with reference to FIG. 2. Equally spaced securing means in excess of three ensures that balanced centering forces will be applied to the stator by the securing means to maintain the stator in axial alignment with the housing at such times as the thermal expansion of the housing will have caused the loss of frictional engagement between the inner wall of the housing and the outer periphery of the stator.

Referring to FIG. 2, the securing means 20 comprises a disk-like key 21 slidingly fitted in the lower end of a bore 22 in boss 17 and extending through the inner wall of housing 10 to engage a matching keyway 23 machined in the outer periphery of stator 15. The upper end 22' of bore 22 is internally threaded to receive a loading screw 24. A guide hole 25 extends completely through loading screw 24 and receives a pilot shank 26 formed on the upper surface of key 21. One or more Belleville-type spring washers are carried on shank 26 between the lower end of loading screw 24 and the upper surface of key 21. The spring washers 27 may be stacked in series wherein the concave surfaces of a pair face one another or they may be stacked in parallel wherein the washers are nested together with the concave surfaces all facing in the same direction. The washers may also be stacked in a combination of series and parallel arrangements. The factors governing the choice of washer arrangement will become evident hereinafter. For oil cooled machines it is desirable to seal the bore 22 by means of a plug screw 28 which is threaded into the upper end of boss 17. The seal afforded by plug screw 28 is improved by a captivated O-ring 29 carried by the plug.

The depth to which load screw 24 is driven into boss 17 determines the deflection of the spring washers 27 and hence the preload on key 21. When the housing 10 expands away from the stator 15 the effect is the same as if the load screw 24 were backed out of the boss 17 an amount equal to the separation between the housing and the stator. This reduction in deflection of the springs 27 tends to reduce the thrust of key 21 against the rotor 15. Key 21 is designed with sufficient thickness to remain in shear contact with the walls of bore 22 and keyway 23 at the extreme of the housing expansion. Also, the spring load-deflection characteristic is selected to insure that at the extreme of housing expansion, adequate thrust is exerted on key 21 to maintain the same buttomed in keyway 23 with sufficient force to overcome the decentering force exerted by armature reaction on stator 15.

The use of series, parallel or combined series-parallel stacks of springs enables the designer to select from available springs a combination which will provide adequate centering thrust over the range of spring deflections which will be encountered during thermal expansion of the housing. When the springs are stacked in series, the deflection produced by a given load on the stack is very nearly equal to the deflection of the spring at that load multiplied by the number of springs in the stack. When the springs are stacked in parallel the load necessary to produce a given deflection of the stack is very nearly equal to the load necessary to deflect a single spring by that amount multiplied by the number of springs in the stack. Thus it is possible for the designer by variation of the spring arrangements to cover a wide range of deflection-load requirements with a limited variety of spring characteristics.

Another advantage of the Belleville-type spring is that over a portion of the load-deflection characteristic thereof the load remains constant for an appreciable range of deflection. Thus it is possible for the designer, by selection of the appropriate spring combination, to provide a load-deflection characteristic which exhibits constant load over the range of deflection induced by expansion of the housing. The desirable result of such a characteristic is that no appreciable reduction in the centering force exerted by the securing means will occur upon expansion of the housing.

Assembly of the stator 15 to the housing 10 is simplified by adjusting load screw 24 with an adjustable torque wrench which is set to apply maximum torque in the amount calculated to provide the correct preload on key 21. Tolerances on the load-deflection characteristics of the springs 27 then do not affect proper assembly and operation of the invention.

Obviously, if the thickness of the housing is sufficient to contain the securing means 20 the bosses 17 can be dispensed with and the bore 22 can be made directly through the housing wall. Obviously, also, it is not essential to employ a plurality of Belleville springs if the desired load-deflection characteristic can be obtained in a single spring. Other variations are possible in the light of the above teachings. It is to be understood that the invention is limited solely by the scope of the appended claims.

The invention claimed is:

1. In a rotating electrical machine having a stator of generally cylindrical form and a housing surrounding said stator in close fitting relationship at lower temperatures, said housing and said stator being subject to thermal expansion in different amounts resulting in loss of close fit at higher temperature;

means for securing said stator against relative movement in said housing and for maintaining said stator centered therein, comprising a keyway formed in the outer periphery of said stator;

a threaded aperture in said housing aligned with said keyway;

a key in said aperture engaging said keyway, said key being so dimensioned as to maintain shear contact with the walls of said aperture and said keyway throughout the range of thermal expansion to which said housing and said stator are subject;

spring means in said aperture and bearing on said key to exert a radially directed thrust on said key and said stator when loading forces are applied to said key; and a loading screw threaded into said aperture and bearing on said spring means to exert a loading force on said spring means according to the distance said loading screw is threaded into said aperture, and to the degree necessary for maintaining the stator centered within the housing and for maintaining the shear contact even after the spring loading force is relaxed by the thermal expansion of the housing and stator in different amounts.

2. Securing means as claimed in claim 1 wherein said spring means is of the Belleville washer type.

3. Securing means as claimed in claim 1 wherein said spring means comprises a plurality of the Belleville washer type arranged in series combination.

4. Securing means as claimed in claim 1 wherein said spring means comprises a plurality of the Belleville washer type arranged in parallel combination.

5. Securing means as claimed in claim 1 wherein said spring means comprises a plurality of the Belleville washer type, a portion of said plurality being arranged in series combination and the remainder of said plurality being arranged in parallel combination.

6. In a rotating electrical machine having a stator of generally cylindrical form and a housing surrounding said stator in close fitting relationship at lower temperatures, said housing and stator being subject to thermal expansion in different amounts resulting in loss of close fit at higher temperatures, means for securing and supporting said stator in centered relationship within said housing, comprising a plurality of cylindrical apertures extending through said housing and directed radially toward the stator to be supported in said housing, said apertures being equally spaced about the circumference of said housing and being internally threaded at least in the outmost portion thereof, a plurality of cylindrical keyways formed in the outer periphery of said stator in alignment with said apertures;

a generally cylindrical key in each of said apertures, each said key engaging in shear the wall of its associated aperture and the wall of the keyway aligned therewith and bearing radially upon said stator;

spring means of the Belleville type in each of said apertures and bearing upon the end of said key within said aperture to exert when loaded a thrust upon said key and radially upon said stator; and a loading screw carried in the threaded portion of each said aperture for applying a thrust load upon said spring means commensurate with maintaining the stator in centered relationship within the housing and for maintaining the shear engagement even after the spring thrust load is relaxed by the thermal expansion of the housing and stator in different amounts.

7. Securing means as claimed in claim 6 wherein each said loading screw is adjusted to a predetermined torque whereby equal thrusts are applied to each said key by each said spring means.

* * * * *